3 Sheets--Sheet 1.

S. J. NEWSHAM, W. H. HAINES & W. S. HENSON.
Production of Ice.

No. 152,914. Patented July 14, 1874.

Witnesses:
John D. Poppin
E D Hamsworth

Inventors.
Sydney James Newsham
W. H. Haines
Wm. S. Henson

S. J. NEWSHAM, W. H. HAINES & W. S. HENSON.
Production of Ice.
No. 152,914. Patented July 14, 1874.
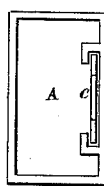
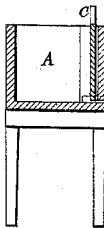
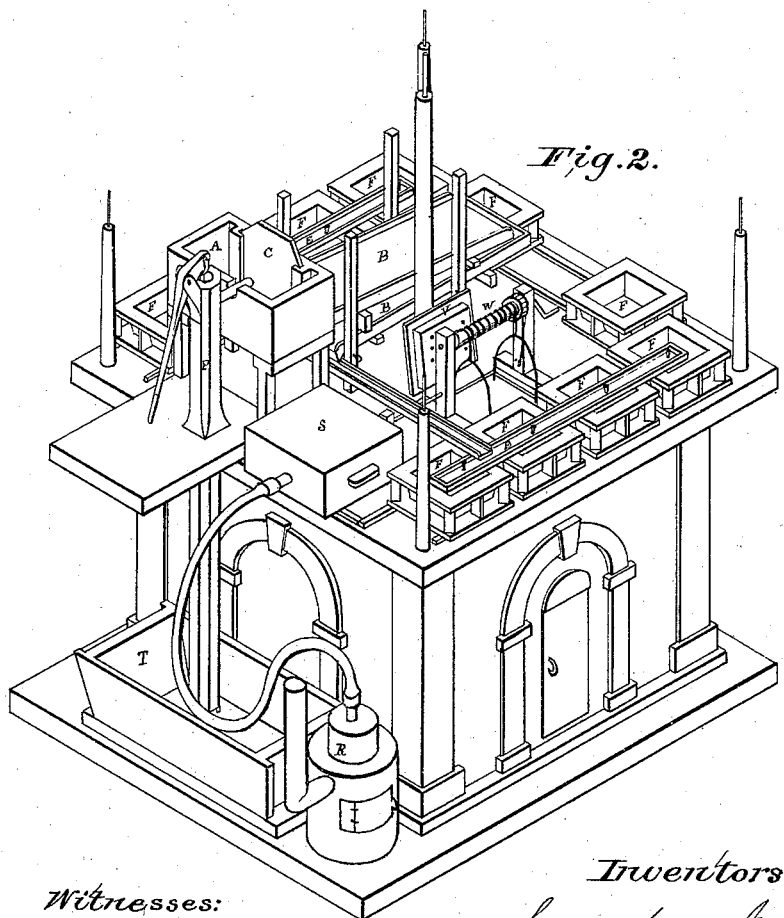

3 Sheets--Sheet 3.

S. J. NEWSHAM, W. H. HAINES & W. S. HENSON.
Production of Ice.

No. 152,914. Patented July 14, 1874.

UNITED STATES PATENT OFFICE.

SYDNEY J. NEWSHAM, WILLIAM H. HAINES, AND WILLIAM S. HENSON, OF NEWARK, NEW JERSEY.

IMPROVEMENT IN THE PRODUCTION OF ICE.

Specification forming part of Letters Patent No. 152,914, dated July 14, 1874; application filed June 18, 1874.

*To all whom it may concern:*

Be it known that we, SYDNEY JAMES NEWSHAM, WILLIAM H. HAINES, and WILLIAM S. HENSON, of Newark, New Jersey, have invented a Method for Manufacture of Ice, of which the following is a specification:

The object of our inventions or improvements is to extend the power and usefulness of our mode of producing ice, as described in Letters Patent No. 108,816, dated November 1, 1870, first, by combining an ice-house and freezing-house together in one building by constructing the freezing-house containing the freezing-tanks and improved cooling-planes on the top of the ice-house, the freezing-house being covered in by a canvas roof and walls supported by suitable frame-work for protection from sun, rain, and snow, the canvas covering being readily removed entirely or in part on cold clear nights, thereby increasing the freezing-power by free radiation; secondly, by an arrangement of water-tanks and cooling-planes combined and connected by a pump and leaders with the canvas freezing-tanks for cooling the water to the freezing temperature.

Figure 1:
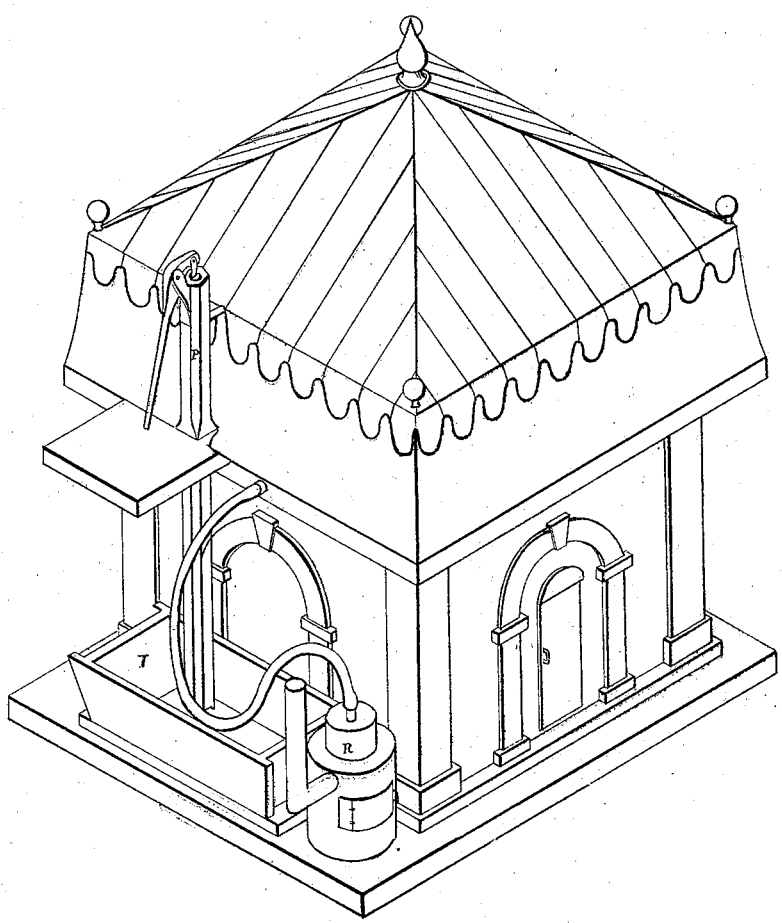

Figure 1, Sheet 1, is a perspective view of our combined ice-house and freezing-house, the latter being constructed on the top of the ice-house and forming the roof thereof, and being covered in and inclosed by a canvas roof and walls supported by a suitable framing, the object being to make the ice in the freezing-house and store it for future use in the ice-house.

Fig. 2, Sheet 2, is a perspective view of the same with the canvas roof and walls and part of the framing removed, and showing the complete arrangement of the water-tank below connected by the pump to the regulating-cistern, cooling-planes, leaders, and freezing-tanks, showing, also, the portable furnace and boiler below connected by a hose to the steam-box above; also, the winch for lowering the blocks of ice into the ice-house, the whole combined or essential parts thereof constituting a freezing-house more or less complete.

Figs. 3, 4, and 5 is a detailed plan and side sectional view of the regulating-cistern A, with its adjustable water-gate for regulating the flow through its elongated slit aperture, and the cooling-planes B B, consisting of one or more frames of wood or metal, shown at Fig. 5, which frames, when covered with thin sheet metal or canvas, as shown at Figs. 3 and 4, constitute the improved cooling-planes.

Figure 6:
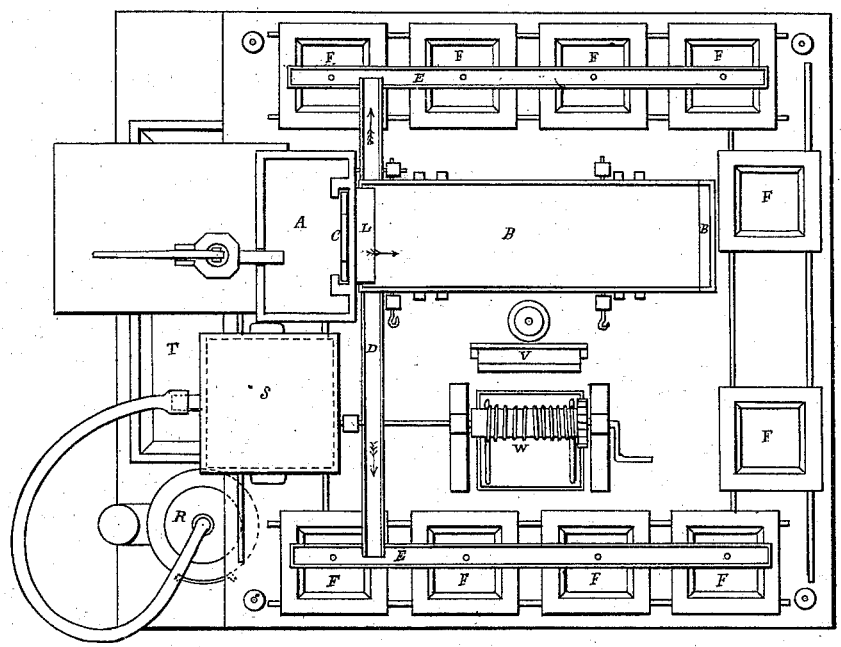

Fig. 6, Sheet 3, is a plan of the floor of the freezing-house, showing the general arrangement of the apparatus lettered as follows: F F F are the freezing-tanks; A, the regulating-cistern with its elongated slit aperture H at the bottom partly closed by an adjustable gate, C, (vide Fig. 4;) B B, the cooling-planes; D, a leader for conveying the icy-cold water to the other two leaders E and E, which latter are provided with holes partially closed with plugs of wood, through which holes the freezing water slowly trickles into the freezing-tanks F F. S is the steam-box connected by a rubber hose to the portable boiler and furnace shown below at R. W is the winch for lowering the blocks of ice into the ice-house.

Figure 7:
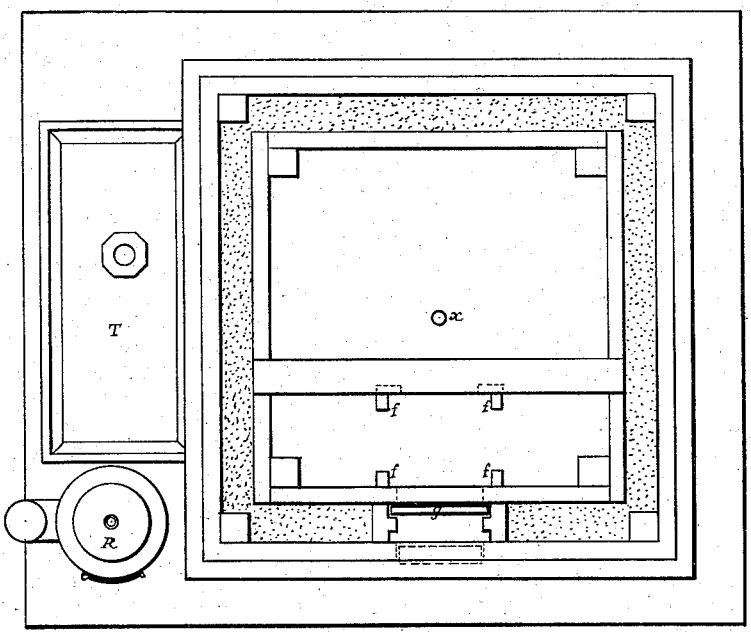

Fig. 7 is a plan of the ice-house, the roof of which being removed shows the interior and the double walls filled in with sawdust. *f f* are the guides for the winch-platform.

The most effective mode of operating with this combination of apparatus is as follows: The large water-tank T, being filled with water from a well or hydrant at a probable temperature of 50° to 60° Fahrenheit, during moderate freezing weather may be allowed to stand at rest about one night, and any thin ice forming upon its surface may then be broken and stirred up along with the water. Then, by means of the pump P, some of the water may be pumped into the regulating-cistern A, and upon very slightly raising the gate C a thin film of water will trickle through the elongated slit aperture H, situated at the lower side of the cistern, over the lip L onto the inclined cooling-plane B, where it is exposed to the action of the cool freezing breeze. When the water has flowed to the bottom of the first plane it will be caught by the second cooling-plane and conducted to the leader D, whence it will flow to the two leaders E E, which will conduct it to the freezing-tanks. It is not desirable that the water should be allowed to freeze on its way to the freezing-tanks, and any tendency to do so may be checked by partially protecting the water from the cold air during its passage; but the flow of water should be so regulated that its temperature will be at the freezing-point when it enters the freezing-tanks, and freeze in the tanks nearly as fast as it enters. When the tanks are full and frozen solid, then a fire may be kindled in the furnace under the boiler R, the steam from which will readily loosen the blocks of ice in such tanks as the steam-box is placed over, when the blocks should be immediately removed onto the platform of the winch and lowered into the ice-house, to be stored for future use, the water being replenished from time to time, as needed in the tank T. The ice-house proper is built in the ordinary manner, (excepting the roof,) having double walls as nearly air-tight as possible, filled in with sawdust or other non-conducting material, having also double doors, and being well drained by a trap-drain, which will permit the escape of water without allowing air to enter. The roof of the ice-house constituting the floor of the freezing-house should be water-tight and filled in underneath with sawdust; and the hatch-cover V (leaning against the center-pole) may be pierced with a few small holes for ventilation.

It is well known that an ice-house is best to be sheltered from the sun, yet it may be exposed on the north side to the weather with some advantage.

A combined ice and freezing house, as above described, should be shaded from the sun by trees or other means as much as possible. Combined ice and freezing houses, as here described, may be constructed of various sizes and productive capacity ranging from ten tons, suitable for private houses, to two hundred tons, suitable for butchers and confectioners, and one thousand tons and over for commercial purposes. By their use ice can be produced in any desired quantities in locations where none is to be obtained from ponds or rivers and in latitudes where rivers never freeze over by taking care always to secure the results of freezing weather by storing the ice produced before it can be thawed out by changes of weather. This mode of producing ice may be used to advantage as far south as northern Alabama. Freezing will be accomplished most rapidly when the canvas roof and walls are removed and the uncovered freezing-tanks are free to radiate their heat. In a more southerly location the number of cooling-planes may be increased to advantage, and the quantity of ice produced during a winter north of Baltimore may be safely estimated at not less than about two tons for each freezing-tank twenty-eight inches square by ten inches deep. Snow may be used in the main tank to facilitate the cooling whenever it can be obtained.

We do not claim an ice-house with double walls and doors, as that is not new; and we do not here claim the use of the freezing-tanks made of canvas or the use of the steam-box for loosening the blocks of ice, as both these were the subject of a patent, No. 108,816, dated November 1, 1870, granted to us; but

We claim—

1. The combination of an ice-house for storing ice with a freezing-house for producing ice, the latter being constituted as such by containing the implements, as shown, necessary for that purpose, and both ice-house and freezing-house being constructed substantially as described.

2. The cooling-planes B B, for reducing the temperature of the water, combined with the regulating-cistern A, Figs. 3 and 4, substantially as shown and described, and for the purposes mentioned.

3. The cooling-planes B B alone, substantially as shown and described.

SYDNEY JAMES NEWSHAM.
W. H. HAINES.
WM. S. HENSON.

Witnesses:
JOHN D. TOPPIN,
E. D. FARNSWORTH.